United States Patent
Okubo et al.

(10) Patent No.: US 9,254,760 B2
(45) Date of Patent: Feb. 9, 2016

(54) CONTROLLING TORQUE OF A VEHICLE TRACTION MOTOR

(71) Applicant: FORD GLOBAL TECHNOLOGIES, LLC, Dearborn, MI (US)

(72) Inventors: Shunsuke Okubo, Belleville, MI (US); Carol L. Okubo, Belleville, MI (US); Walter J. Ortmann, Saline, MI (US); Marvin P. Kraska, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 77 days.

(21) Appl. No.: 14/226,936

(22) Filed: Mar. 27, 2014

(65) Prior Publication Data

US 2015/0274031 A1    Oct. 1, 2015

(51) Int. Cl.
| | |
|---|---|
| *B60L 7/10* | (2006.01) |
| *B60W 10/08* | (2006.01) |
| *B60L 15/20* | (2006.01) |
| *B60L 7/18* | (2006.01) |
| *B60W 30/18* | (2012.01) |
| *B60W 20/00* | (2006.01) |
| *B60L 3/00* | (2006.01) |
| *B60L 3/04* | (2006.01) |
| *B60L 3/06* | (2006.01) |
| *B60L 11/14* | (2006.01) |

(52) U.S. Cl.
CPC .............. *B60L 15/20* (2013.01); *B60L 3/0061* (2013.01); *B60L 3/04* (2013.01); *B60L 3/06* (2013.01); *B60L 7/18* (2013.01); *B60L 11/14* (2013.01); *B60L 15/2009* (2013.01); *B60L 15/2054* (2013.01); *B60L 15/2063* (2013.01); *B60W 10/08* (2013.01); *B60W 20/00* (2013.01); *B60W 20/108* (2013.01); *B60W 30/18127* (2013.01); *B60L 2240/12* (2013.01); *B60L 2240/421* (2013.01); *B60L 2240/423* (2013.01); *B60L 2240/425* (2013.01); *B60L 2240/441* (2013.01); *B60L 2240/443* (2013.01); *B60L 2240/445* (2013.01); *B60W 2510/0676* (2013.01); *B60W 2710/083* (2013.01); *Y02T 10/7275* (2013.01); *Y10S 903/903* (2013.01)

(58) Field of Classification Search
CPC ... B60W 10/08; B60W 20/108; B60W 20/00; B60W 2510/0676; B60W 2710/083; B60W 30/18127; B60L 2240/423; B60L 2240/445; B60L 7/18; B60L 15/2009; B60L 15/2054; B60L 15/2063; Y02T 10/6226; Y02T 10/6286; Y02T 10/642; Y02T 10/7275
USPC .............. 701/22, 53, 70; 180/65.285, 65.265, 180/65.26; 903/906, 947
See application file for complete search history.

(56) References Cited

U.S. PATENT DOCUMENTS

| | | | |
|---|---|---|---|
| 6,636,788 B2 | 10/2003 | Tamagawa et al. | |
| 6,823,840 B1 * | 11/2004 | Tamai et al. | ................... 123/352 |
| 7,024,290 B2 * | 4/2006 | Zhao | ..................... B60K 6/445 |
| | | | 180/65.6 |

(Continued)

*Primary Examiner* — Russell Frejd
(74) *Attorney, Agent, or Firm* — David B. Kelley; MacMillan Sobanski & Todd, LLC

(57) ABSTRACT

A hybrid electric automotive powertrain includes an electric machine operable in propulsive and regenerative modes. The machine has positive and negative torque limits for the propulsive and regenerative modes, respectively, to reduce potential thermal damage to the machine due to overheating. The negative and positive torque limits are reduced independently as a temperature of the machine increases. The negative torque limit may be reduced at a greater rate than the positive torque limit.

12 Claims, 2 Drawing Sheets

(56) References Cited

U.S. PATENT DOCUMENTS

| | | |
|---|---|---|
| 7,562,730 B2 * | 7/2009 | Shimizu et al. ............ 180/65.23 |
| 7,702,432 B2 * | 4/2010 | Bandai et al. .................... 701/22 |
| 8,006,790 B2 * | 8/2011 | Kimura et al. ............... 180/65.6 |
| 8,396,618 B2 | 3/2013 | Cikanek et al. |
| 8,560,156 B2 * | 10/2013 | Kshatriya ....................... 701/22 |
| 2008/0255716 A1 * | 10/2008 | Bandai et al. .................... 701/22 |
| 2011/0254487 A1 * | 10/2011 | Clothier et al. .......... 318/400.14 |
| 2011/0276243 A1 | 11/2011 | Minarcin et al. |

* cited by examiner

CONTROLLING TORQUE OF A VEHICLE TRACTION MOTOR

BACKGROUND OF INVENTION

The present invention relates to a method of controlling a traction motor in a vehicle.

A hybrid powertrain of an automotive vehicle may include an electric machine. The machine may be operated in a propulsive mode, where the machine rotates to produce a torsion force that propels the vehicle. Alternatively, the machine may be operated in a regenerative mode to produce an electrical charge that is stored in a battery. Operation of the machine in the propulsive and regenerative modes produces heat. The heat produced by the machine may be increased when the vehicle is driven in stop and go traffic or on roads with rapid grade changes. Excessive heat may damage the machine. Accordingly, machines typically have a torque limit that is applied to protect the machine from thermal damage due to overheating.

SUMMARY OF INVENTION

An embodiment contemplates a method of controlling torque of a traction motor in a vehicle. A temperature of the motor is measured, the motor having positive and negative torque limits. When the measured temperature is above a first temperature limit, and below a second temperature limit, a reduced negative torque limit is calculated while the full positive torque limit is maintained. The motor is operated using the reduced negative torque limit and the full positive torque limit.

Another embodiment contemplates a method of controlling torque of a traction motor in a vehicle. A temperature of the motor is measured, the motor having first and second torque limits. An adjustment factor is calculated using the measured temperature. A revised first torque limit is calculated using the adjustment factor while the second torque limit is not changed. A torque capacity of the motor is limited using the revised first torque limit and the unchanged second torque limit.

Another embodiment contemplates a motor torque control assembly. A temperature sensor records a temperature of the motor having positive and negative torque limits. A controller receives the temperature from the sensor and adjusts the positive and negative torque limits as a function of the temperature. The positive and negative torque limits are adjusted independently.

An advantage of an embodiment is that traction motor torque is limited independently for different operating modes of the traction motor. The torque limits may be applied independently for the propulsive and regenerative modes of the machine. This improves driveablity of the vehicle when the traction motor torque is limited due to overheating.

DETAILED DESCRIPTION

Figure 1:
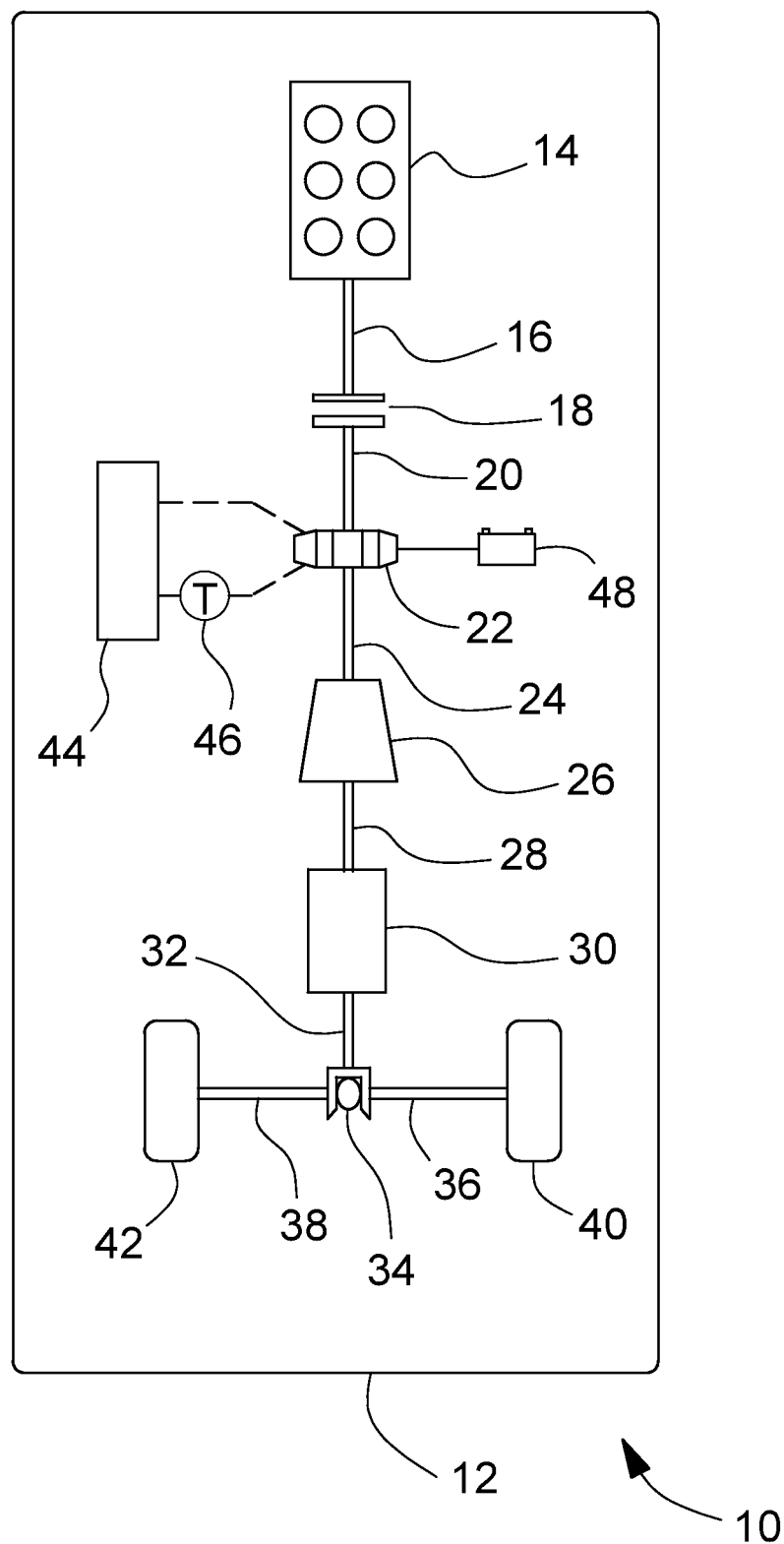
FIG. 1 is a schematic view of a vehicle having a hybrid electric powertrain.

FIG. 1 schematically illustrates a hybrid electric powertrain 10 for an automotive vehicle 12. This powertrain is exemplary and may be employed on rear wheel drive, front wheel drive, and all wheel drive vehicles.

The powertrain 10 includes an internal combustion engine 14 driving a crankshaft 16. Interposed between the engine 14 and an electric machine (traction motor) 22 is a clutch 18. The machine 22 operates in different modes, both as a motor to provide vehicle propulsion and as a generator that charges a battery 48. When engaged, the clutch 18 connects the crankshaft 16 with an electric machine input 20 and transmits torque between the engine 14 and the machine 22. In turn, the machine 22 transmits torque to a torque converter 26 through a torque converter input 24 and the torque converter 26 transmits torque to a transmission 30 through a transmission input 28. The transmission 30 turns a driveshaft 32 which in turn drives a differential 34. The differential 34 transmits torque to first and second axles 36 and 38, respectively, which drive first and second wheels 40 and 42, respectively. Operation of the machine 22 is controlled by a motor controller 44. A temperature sensor 46 monitors a temperature 102 (shown in FIG. 2) of the machine 22 and relays it to the controller 44. The battery 48 is electrically connected to the machine 22.

Figure 2:
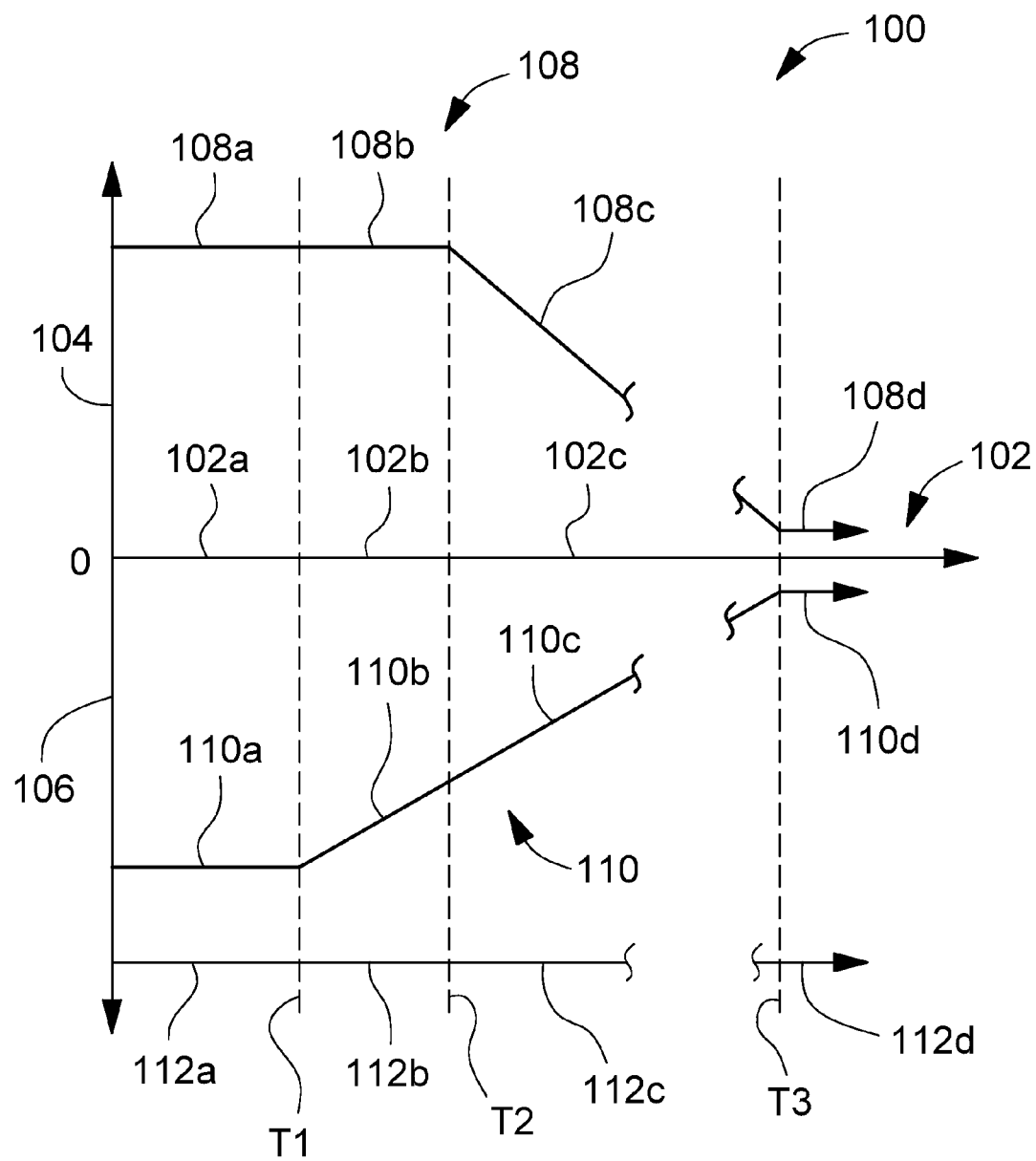
FIG. 2 is a graph of engine torque limits and temperature.

FIG. 2 will now be discussed with reference to FIG. 1. FIG. 2 graphically illustrates propulsive and regenerative torque capacities 104 and 106, respectively, of the machine 22 and the temperature 102 of the machine 22 during a torque capacity limiting routine 100. In FIG. 2, the temperature 102 increases rightward. The propulsive and regenerative torque capacities 104 and 106, respectively, are limited as a function of the temperature 102.

The machine 22 has propulsive and regenerative modes. In the propulsive mode, the machine 22 uses power from the battery 48 to produce torque to rotate the torque converter input 24, which results in the first and second wheels 40 and 42, respectively, being driven. In the regenerative mode, energy, such as the kinetic energy of the vehicle 12 is used to rotate the machine 22 to produce an electrical charge that is stored in the battery 48. The regenerative mode may be employed to brake the vehicle 12 and may be activated by a vehicle brake request. The motor controller 44 sets first and second torque limits 108 and 110, respectively, for the machine 22. The first and second torque limits 108 and 110, respectively, may be set to reduce the potential of thermal damage to the machine 22 due to overheating. The motor controller 44 does not allow a torque request to exceed either the first or the second torque limits 108 and 110, respectively. The first torque limit 108 is a positive torque limit that limits the propulsive torque capacity 104 of the machine 22 when the machine 22 is operating in the propulsive mode. The second torque limit 110 is a negative torque limit that limits the regenerative torque capacity 106 of the machine 22 when the machine 22 is operating in the regenerative mode.

In a first temperature range 112a, a first temperature 102a of the machine 22 is measured by the temperature sensor 46 and relayed to the motor controller 44. The motor controller determines that the first temperature is less than or equal to a first temperature limit T1. The first temperature limit T1 is a temperature at, or below, which the machine 22 may be operated, as understood by one skilled in the art, without regard to potential thermal damage. In the first temperature range 112a, a first torque limit 108a for the propulsive torque capacity 104 and a second torque limit 110a for the regenerative torque capacity 106 are set independently of the first temperature. The first and second torque limits 108a and 110a, respectively, are unchanged as a function of the first temperature. (The first and second torque limits 108a and 110a, respectively, may be changed as a function of a value other than the temperature 102.) In the first temperature range 112a, the machine 22 is normally operated in the propulsive mode not exceeding the first torque limit 108a and in the regenerative mode not exceeding (in the negative direction) the second torque limit 110a.

In the second temperature range 112b, a second temperature 102b of the machine 22 is measured by the temperature sensor 46 and relayed to the motor controller 44. The motor controller determines that the second temperature is greater than the first temperature limit T1 but less than a second temperature limit T2. Between the first temperature limit T1 and the second temperature limit T2 are a range of temperatures at which potential thermal damage to the machine 22, as understood by one skilled in the art, is a concern. In the second temperature range 112b, the motor controller 44 calculates a first adjustment factor and uses the first adjustment factor to set the second torque limit 110b. This second torque limit 110b is lower than the first torque limit 110a in the first temperature range 112a. This second torque limit 110b may ramp down the allowable regenerative torque (first adjustment factor) as the temperature increases within the second temperature range. This ramp down (first adjustment factor) may be, for example, a linear ramp down, but may also operate using a different non-linear function. The first torque limit 110b is determined by using the first adjustment factor to adjust the first torque limit 110a. In the second temperature range 112b, the first torque limit 108b is unchanged from the first torque limit 108a as a function of the temperature 102. (The first torque limit 108b may be changed as a function of a value other than the temperature 102.) In the second temperature range 112b, the machine 22 is operated in the propulsive mode not exceeding the first torque limit 108b and in the regenerative mode not exceeding the second (reduced) torque limit 110b.

In a third temperature range 112c, a third temperature 102c of the machine 22 is measured by the temperature sensor 46 and relayed to the motor controller 44. The motor controller 44 determines that the third temperature is greater than or equal to the second temperature limit T2 and less than a third temperature limit T3. At or above the second temperature limit T2, and below T3, there is the potential of increased thermal damage to the machine 22. In the third temperature range 112c, the motor controller 44 calculates a second adjustment factor for a first torque limit 108c and a third adjustment factor for a second torque limit 110c, in order to reduce the torque on the machine. The motor controller 44 uses the second adjustment factor to set the first torque limit 108c by adjusting the first torque limit 108b and the third adjustment factor to set the second torque limit 110c by adjusting the second torque limit 110b. These ramp down factors may be, for example, a linear ramp down, but may also operate using different non-linear functions. In the third temperature range 112c, the machine 22 is operated in the propulsive mode not exceeding the first torque limit 108c and in the regenerative mode not exceeding the second torque limit 110c.

As a temperature in the third temperature range 112c increases, the first and second torque limits 108c and 110c are decreased until a third temperature limit T3 is reached and a limp mode is arrived at in a fourth temperature range 112d. In the limp mode, as understood by one skilled in the art, the machine 22 produces a minimum torque to propel the vehicle 12 at a creep speed. The limp mode mitigates potential severe thermal damage to the machine 22 while still allowing the vehicle 12 to be driven. As illustrated, the first and second torque limits 108c and 110c may arrive at the limp mode at the same temperature T3. Alternatively, the first torque limit 108c may arrive at the limp mode at a different temperature than the second torque limit 110c arrives at the limp mode. In the limp mode, a magnitude of the first and second torque limits 108d and 110d, respectively, may be equal. One of the first or second torque limits 108d and 110d, respectively, may be reached before the other. Alternatively, the first and second torque limits 108d and 110d, respectively, may be reached at the same time. Alternatively, the regenerative torque limit may be zero in the limp mode, with only the propulsion torque being non-zero.

The first, second, and third adjustment factors may each be a different value, all be equal values, or each set independently of the other adjustment factors. For example, the regenerative torque capacity 106 in the temperature interval 112c may be limited independently of the regenerative capacity 106 in the temperature interval 112b. As illustrated, the first, second, and third adjustment factors are linear. Alternatively, one or more of the first, second, and third adjustment factors may be non-linear. As can be seen in the example illustrated in FIG. 2, the first, second, and third adjustment factors may be set such that, at a given temperature, the regenerative torque capacity 106 is more limited than the propulsive torque capacity 104.

As described, the powertrain 10 is a parallel type hybrid electric powertrain. The torque capacity limiting routine 100 is also usable with other powertrains known to one skilled in the art such as electric only powertrains and series and powersplit type hybrid electric powertrains.

While certain embodiments of the present invention have been described in detail, those familiar with the art to which this invention relates will recognize various alternative designs and embodiments for practicing the invention as defined by the following claims.

The invention claimed is:

1. A method of controlling torque of a vehicle traction motor with positive and negative torque limits, comprising:
when a motor temperature is in a predetermined range, operating the motor using a reduced negative torque limit and a full positive torque limit.

2. The method of claim 1 further including when the motor temperature is above the predetermined range, operating the motor using a further reduced negative torque limit and a reduced positive torque limit.

3. The method of claim 1 wherein a magnitude of the reduced negative torque limit is a function of the motor temperature, with the magnitude of reduction increasing as the temperature increases.

4. The method of claim 1 wherein the motor produces a negative torque in response to a vehicle brake request.

5. The method of claim 1 wherein the positive and negative torque limits are applied to the motor by a motor controller.

6. A traction motor torque control assembly for a traction motor having positive and negative torque limits, comprising:
a controller configured to adjust the positive and negative torque limits, independently, as a function of motor temperature.

7. The assembly of claim 6 wherein the controller is configured such that a magnitude of the adjusted positive torque limit is different from a magnitude of the adjusted negative torque limit.

8. The assembly of claim 6 wherein the controller is configured such that adjustment of the positive torque limit is not equal to adjustment of the negative torque limit.

9. The assembly of claim 6 wherein the controller is configured such that, in a predetermined temperature range the positive torque limit is not adjusted as a function of the temperature.

10. The assembly of claim 6 wherein the controller is configured such that, in a predetermined temperature range the negative torque limit is adjusted while the positive torque limit is maintained constant.

11. The assembly of claim 6 wherein the controller is configured such that a magnitude of the positive and negative torque limits decreases as the temperature of the machine increases.

12. A method of controlling torque of a vehicle traction motor with positive and negative torque limits, comprising:
  when a motor temperature is in a predetermined range, operating the motor using a reduced negative torque limit and a full positive torque limit;
  when the motor temperature is above the predetermined range, operating the motor using a further reduced negative torque limit and a reduced positive torque limit;
  wherein a magnitude of the reduction of the negative torque limit is greater than a magnitude of the reduction of the positive torque limit.

* * * * *